(12) United States Patent
Mucaro

(10) Patent No.: US 9,233,728 B2
(45) Date of Patent: Jan. 12, 2016

(54) CONVERTIBLE SCOOTER RIDE-ON

(71) Applicant: JAKKS Pacific, Inc., Malibu, CA (US)

(72) Inventor: Damian Mucaro, Hackensack, NJ (US)

(73) Assignee: JAKKS Pacific, Inc., Santa Monica, CA (US)

(*) Notice: Subject to any disclaimer, the term of this patent is extended or adjusted under 35 U.S.C. 154(b) by 0 days.

(21) Appl. No.: 14/505,057

(22) Filed: Oct. 2, 2014

(65) Prior Publication Data

US 2015/0097346 A1 Apr. 9, 2015

Related U.S. Application Data

(60) Provisional application No. 61/886,520, filed on Oct. 3, 2013.

(51) Int. Cl.
| | |
|---|---|
| *B62K 13/06* | (2006.01) |
| *B62K 3/00* | (2006.01) |
| *B62K 9/00* | (2006.01) |
| *B62K 13/00* | (2006.01) |

(52) U.S. Cl.
CPC ............... *B62K 13/06* (2013.01); *B62K 3/002* (2013.01); *B62K 9/00* (2013.01); *B62K 13/00* (2013.01)

(58) Field of Classification Search
CPC ...................................................... B62K 13/06
USPC ............... 280/282, 87.041, 259, 248, 87.05, 280/87.051, 221, 7.1, 7.15
See application file for complete search history.

(56) References Cited

U.S. PATENT DOCUMENTS

| | | | |
|---|---|---|---|
| 6,089,586 A | 7/2000 | Rudell et al. | |
| 6,296,268 B1 * | 10/2001 | Ford et al. | 280/648 |
| D631,102 S | 1/2011 | Jessie, Jr. | |
| 8,500,134 B2 | 8/2013 | Tzoreff | |
| 8,517,403 B2 * | 8/2013 | Jessie, Jr. | 280/87.041 |
| 8,523,193 B1 | 9/2013 | Mucardo et al. | |
| 8,801,010 B2 * | 8/2014 | Deb | 280/87.05 |
| 2005/0000702 A1 * | 1/2005 | Shim | 169/51 |
| 2008/0179850 A1 * | 7/2008 | Catelli | 280/87.051 |
| 2012/0068433 A1 * | 3/2012 | Eliasson | 280/221 |
| 2013/0033012 A1 * | 2/2013 | Arjomand et al. | 280/7.17 |

FOREIGN PATENT DOCUMENTS

| | | |
|---|---|---|
| CN | 201 980 351 | 9/2011 |
| WO | WO 2013/090953 | 6/2013 |

OTHER PUBLICATIONS

PCT International Search Report and the Written Opinion of the International Searching Authority for PCT/US2014/058900; Date of mailing Dec. 12, 2014.

* cited by examiner

*Primary Examiner* — Hau Phan
(74) *Attorney, Agent, or Firm* — Tope-McKay & Associates

(57) ABSTRACT

The present invention relates to a convertible scooter ride-on and, more particularly, to a convertible toy that converts between a scooter and ride-on toy. The convertible scooter ride-on includes a base with a plurality of wheels attached thereto and a seat portion pivotally attached with the base. A handle pole is pivotally attached with the seat portion. Notably, the seat portion and handle pole are convertible between a first ride-on configuration in which the seat portion operates as a seat for a rider and a second scooter configuration in which the seat portion and handle pole are pivoted up and securely locked into an erect position, whereby in the scooter configuration, a user can stand on the base.

5 Claims, 5 Drawing Sheets

CONVERTIBLE SCOOTER RIDE-ON

CROSS-REFERENCE TO RELATED APPLICATIONS

This is a non-provisional application of U.S. Provisional Application No. 61/886,520, filed on Oct. 3, 2013, entitled, "Convertible Scooter Ride-On."

BACKGROUND OF THE INVENTION (1) Field of Invention

The present invention relates to a convertible scooter ride-on and, more particularly, to a convertible toy that converts between a scooter and ride-on toy.

(2) Description of Related Art

Ride-on toy vehicles have long been known in the art. Ride-on vehicles are typically miniature vehicles or toys with a seat that a child can sit on and push themselves around on. Alternatively, a scooter is a toy vehicle that allows a user to stand while scooting about Each of the ride-on and scooter provide for a distinct and unique riding experience. Traditionally, if a child wanted a scooter or ride-on, they would need to obtain two separate items which, as can be appreciated, can be costly.

Thus, a continuing need exists for a single convertible to that converts between a scooter and a ride-on toy.

SUMMARY OF INVENTION

The present invention relates to a convertible scooter ride-on and, more particularly, to a convertible toy (i.e., convertible scooter ride-on) that converts between a scooter and ride-on toy. The convertible scooter ride-on includes a base with a plurality of wheels attached thereto and a seat portion pivotally attached with the base. A handle pole is pivotally attached with the seat portion. Notably, the seat portion and handle pole are convertible between a first ride-on configuration in which the seat portion operates as a seat for a rider and a second scooter configuration in which the seat portion and handle pole are pivoted up and securely locked into an erect position, whereby in the scooter configuration, a user can stand on the base.

In another aspect, when in the scooter configuration, an upper surface of the base is exposed to operate as a platform upon which a rider can stand to operate the scooter.

In yet another aspect, the convertible toy includes a scooter locking mechanism, the scooter locking mechanism operable for allow a user to selectively lock the seat portion and handle pole in the scooter configuration.

In another aspect, the scooter locking mechanism includes a first latch system and a second latch system, the first latch system being operable for latching, the handle pole in an erect position with respect to the seat portion, and wherein the second latch system is operable for latching the seat portion in an erect position with respect to the base.

Additionally, the first latch system includes a pair of spring-loaded retractable pins that are slidably positioned within a first latch and lockable with one or more retaining walls. Further, the handle pole includes a first catch for selectively locking against the first latch, whereby a user can selectively withdraw the pair of spring-loaded retractable pins from the retaining walls and, thereafter, slide the first latch out of locking engage with the first catch, which allows the handle pole to unlock and pivot into the ride-on configuration.

Additionally, the second latch system includes a pair of spring-loaded retractable pins that are slidably positioned within a second latch and lockable with one or more retaining walls. Further, the base includes a second catch for selectively locking against the second latch, whereby a user can selectively withdraw the pair of spring-loaded retractable pins from the retaining walls and, thereafter, slide the second latch out of locking engage with the second catch, which allows the seat portion to unlock and pivot into the ride-on configuration.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a convertible scooter ride-on and, more particularly, to a convertible toy that converts between a scooter and ride-on toy. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public, inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing, a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1A:
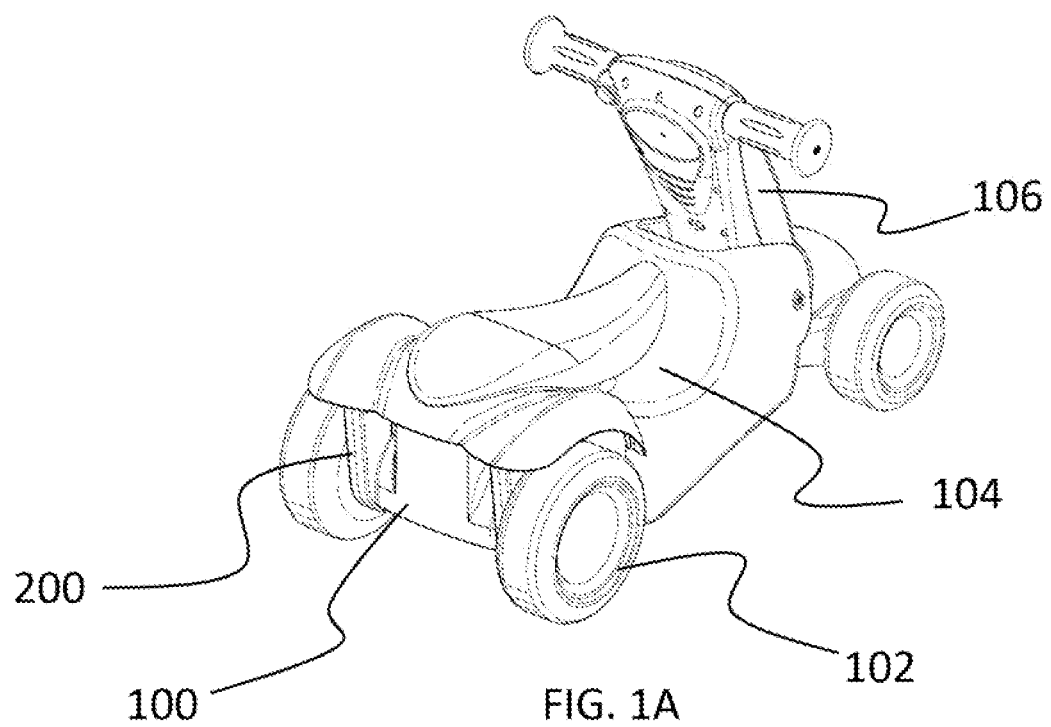
FIG. 1A is an illustration of a convertible scooter ride-on according to the principles of the present invention, depicting the convertible scooter ride-on in the ride-on configuration.

As shown in FIGS. 1A through 5, described is a convertible toy that converts between a scooter and ride-on toy. As can be appreciated by those skilled in the art, the convertible toy can be formed in any suitable shape or manner that allows it to convert between a scooter configuration and a ride-on configuration, a non-limiting example of which is depicted in FIGS. 1A through 5. For example and as shown in FIG. 1A, the toy includes a base 100 with a plurality of rotatable wheels 102, a seat portion 104, and a handle pole 106. In the ride-on configuration as depicted in FIG. 1A, the seat portion 104 rests upon the base 100 to provide a seat upon which a user can site and ride the toy. Alternatively and as shown in the scooter configuration as depicted in FIG. 1B, the seat portion 104 is pivotally attached with the base 100. Further, the handle pole 106 is pivotally attached with the seat portion 104, in this aspect, the both the seat portion 104 and handle pole 106 pivot up 110 and lock into place via a scooter locking mechanism (e.g., locking clips or any other suitable locking mechanism) to form an erect handle pole 106 for a scooter. Further and as illustrated in FIG. 1B which depicts the scooter configuration, an upper surface of the base 100 is exposed to operate as a platform upon which a rider can stand to operate the scooter.

Figure 1B:
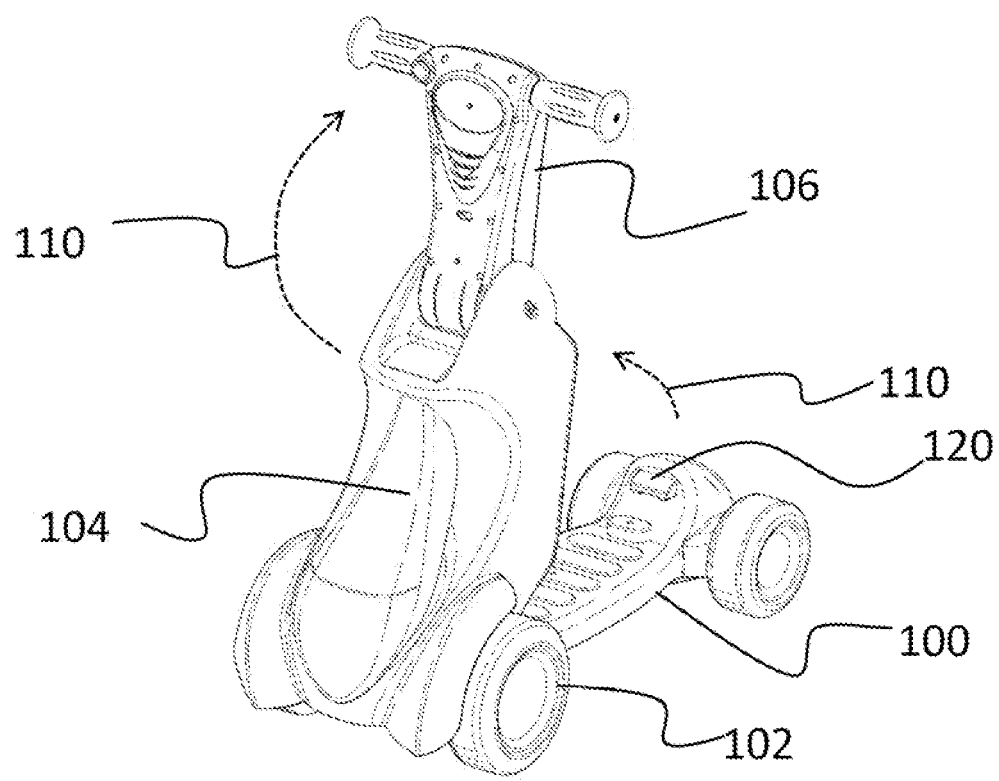
FIG. 1B is an illustration of the convertible scooter ride-on according to the principles of the present invention, depicting the convertible scooter ride-on in the scooter configuration.
Figure 2A:
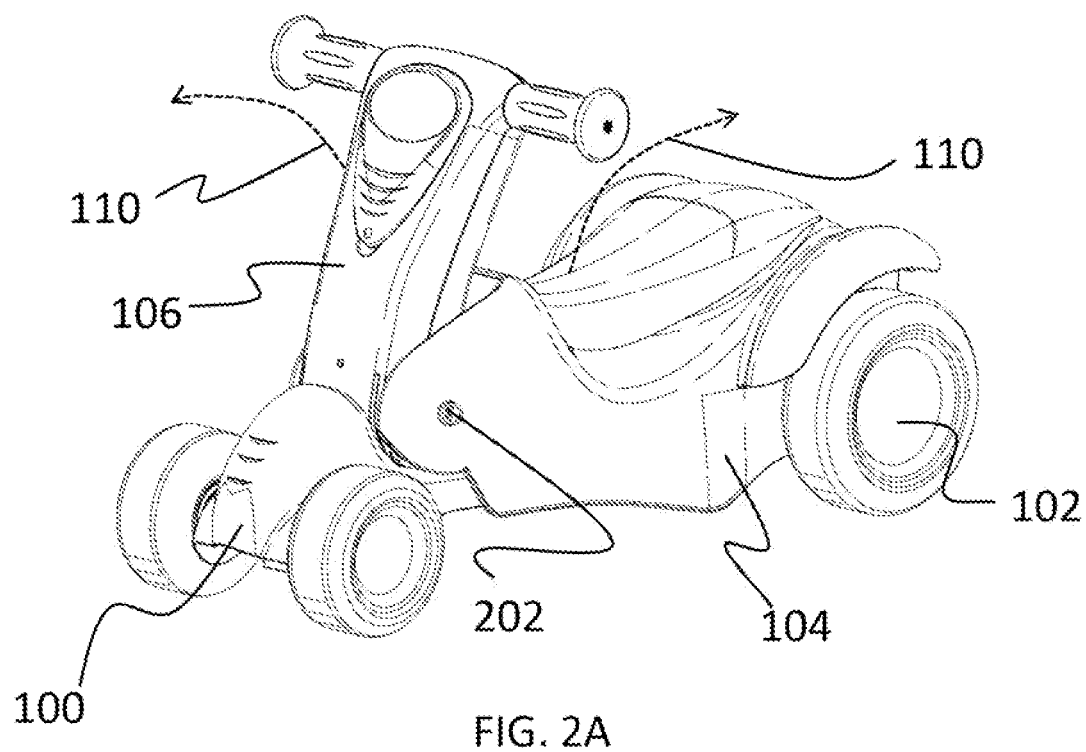
FIG. 2A is an illustration of the convertible scooter ride-on according to the principles of the present invention, depicting the convertible scooter ride-on in the ride-on configuration.
Figure 2B:
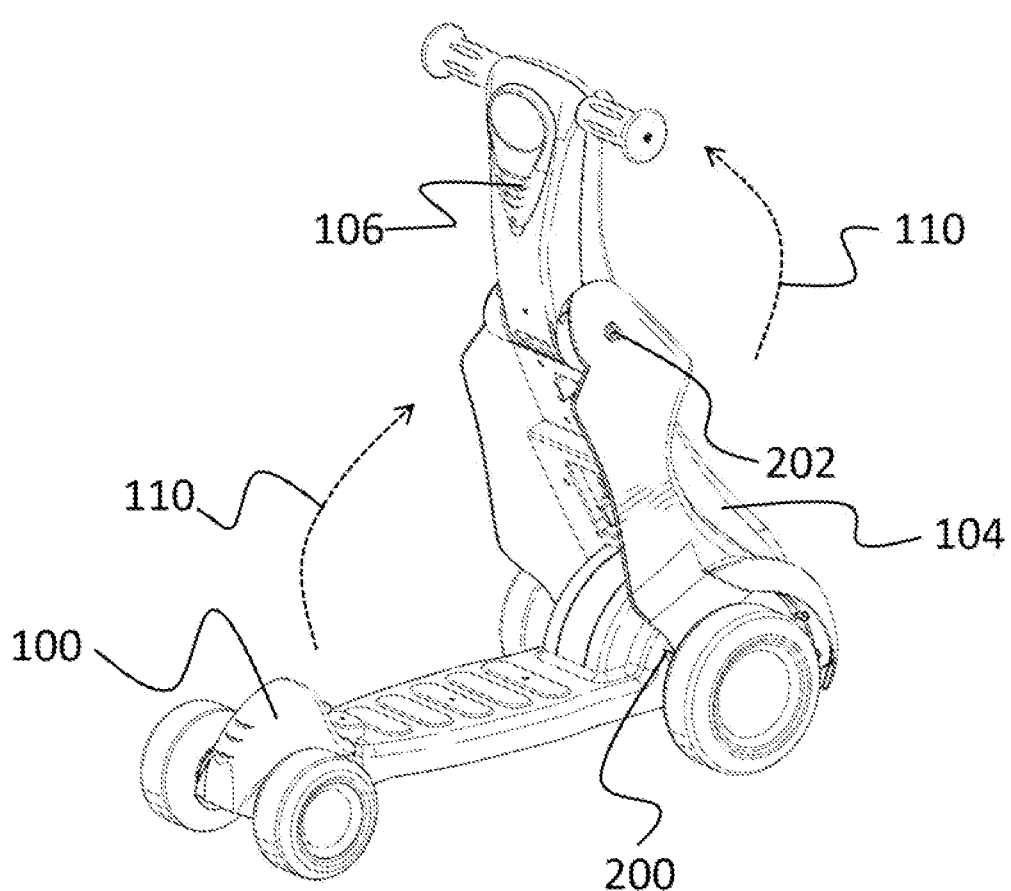
FIG. 2B is an illustration of the convertible scooter ride-on according to the principles of the present invention, depicting the convertible scooter ride-on in the scooter configuration.

These aspects are further depicted in FIGS. 2A and 2B, which illustrate opposite view points from those as illustrated in FIGS. 1A and 1B. As shown in 2A, the seat portion 104 rests upon the base 100 to provide the ride-on configuration. The seat portion 104 is pivotally connected with the base 100 using any suitable connection technique or mechanism that allows for pivotal connection of two components. As a non-limiting example, the wheels 102 have an axle that passes through the base to connect at least two opposing wheels. In this aspect, the seat portion 104 includes brackets 200 (depicted as element 200 in FIG. 1A) with holes passing through the brackets 200. The axle in this aspect passes through the brackets 200 and base 100 to connect the wheels 102 and seat portion with the base 100. Thus, because of the rotational connection with the axle, the seat portion 104 can pivot up 110 and away from the base 100. Further and as noted above, the handle pole 106 is pivotally connected with the seat portion 104 using any suitable connection technique or mechanism that allows for pivotal connection of two components. As a non-limiting example, an axle 202 passes through handle pole 106 and into the seat portion 104 to pivotally connect the handle pole 106 with the seat portion 104.

Figure 3:
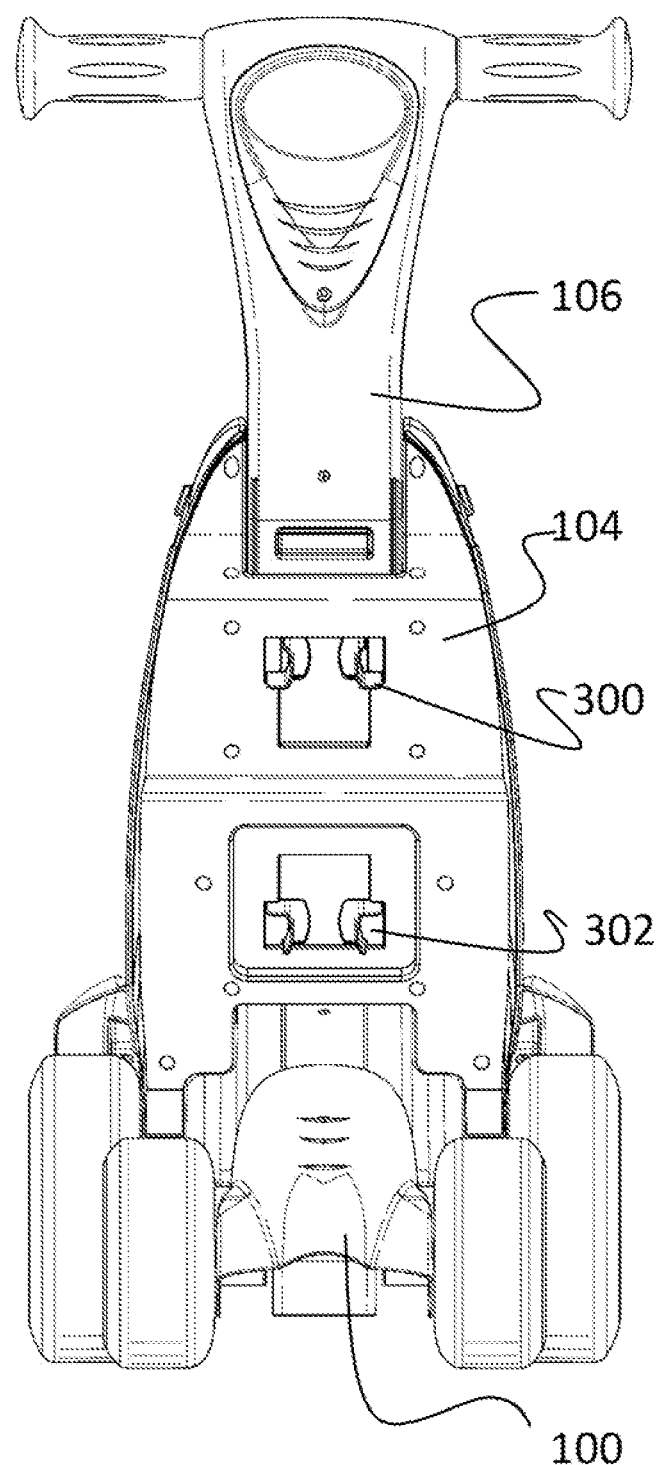
FIG. 3 is a rear-view illustration of the convertible scooter ride-on according to the principles of the present invention.

As can be appreciated, when in the scooter configuration, the convertible toy needs to be relatively stable to prevent it from inadvertently collapsing to the ride-on configuration. To prevent such a collapse, the convertible toy includes a scooter locking mechanism to securely lock the handle pole 106 and seat portion 104 in the erect position during the scooter configuration. The scooter locking mechanism is any suitable mechanism or device that allows a user to selectively lock the handle pole 106 and seat portion 104 in the erect scooter configuration. As a non-limiting example and as shown in FIG. 3, the convertible, toy includes a first latch system 300 and a second latch system 302. More specifically, FIG. 3 provides a rear-view illustration of the convertible toy in the scooter configuration, showing the first and second latch systems 300 and 302. The first latch system 300 is operable for latching the handle pole 106 in an erect position with respect to the seat portion 104, whereas the second latch system 302 is operable for latching the seat portion 104 in an erect position with respect to the base 100.

Figure 4:
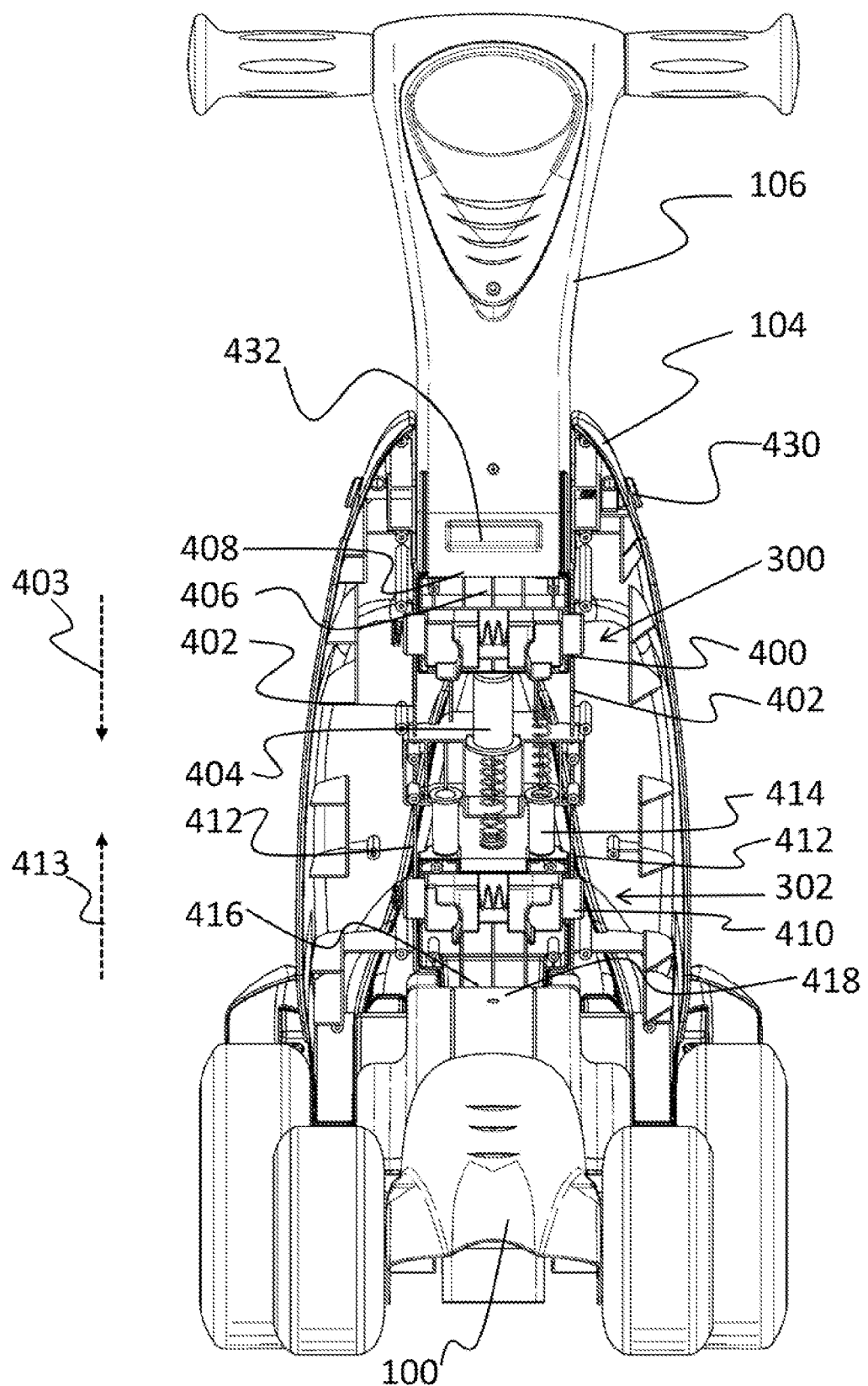
FIG. 4 is an interior-view illustration of the convertible scooter ride-on according to the principles of the present invention.

For further understanding, FIG. 4 provides an interior view illustration of the convertible toy, showing an aspect where the first and second latch systems 300 and 302 are at least partially housed within the seat portion 104. As a non-limiting example, the first latch system 300 includes a first pair of spring-loaded retractable pins 400, When the first pair of pins 400 are drawn toward each other, they are disengaged from a retaining wall 402. In other words, when locked, the first pair of pins 400 are positioned through a hole or space in the retaining wall(s) 402 which locks the pins 400 in place and prevents the pins 400 from being drawn down 403. Alternatively, when the first pair of pins 400 are drawn toward each other (i.e., squeezed together), they are disengaged from the retaining wall 402, which allows a user to slide down 403 a first latch 406. It should be noted that in one non-limiting example, the first pair of pins 400 are slidably positioned within the first latch 406. In other words, the first latch 406 is molded in a manner that allows the pins 400 to slide within the first latch 406. When the pins 400 are slid into the first latch 406 (i.e., disengaged from the retaining wall(s) 402), the user can force the first latch 406 down 403. To prevent the first latch 406 from freely sliding down 403 and as a second or redundant security feature, a spring-loaded latch hold 404 is positioned within the seat portion 104. The spring-latch hold 404 operates as a redundant lock to hold the first latch 406 in a locked position. Thus, the user can draw the first of pair of pins 400 toward each other and disengage the pins 400 from the retaining wall(s) 402; thereafter, the user can force the first latch 406 down 403, which simultaneously forces the latch hold 404 down and compresses the spring that holds the first latch 406 in place. By forcing the first latch 406 down 403, the first latch 406 is removed from a first catch 408 formed in the handle pole 106. In other words, the handle pole 106 includes a first catch 408 that locks against the first latch 406 when the handle pole 106 is positioned in the erect scooter configuration. The first catch 408 is any suitable configuration, mechanism, device, etc., that is operable for locking against a first latch 406, non-limiting example of which include brackets, slots, holes, etc. By sliding the first latch 406 down 403 and away from the first catch 408, the handle pole 106 is free to pivot back to the ride-on configuration.

Similarly, the second latch system 302 includes a second pair of spring-loaded retractable pins 410. When the second pair of pins 410 are drawn toward each other, they are disengaged from a retaining, wall(s) 412. In other words, when locked, the second pair of pins 410 are positioned through a hole or space in the retaining wall(s) 412 which locks the pins 410 in place and prevents the pins 410 from being drawn up 413. Alternatively, when the second pair of pins 410 are drawn toward each other (i.e., squeezed together), they are disengaged from the retaining wall(s) 412, which allows a user to slide up 413 a second latch 416. It should be noted that in one non-limiting example, the second pair of pins 410 are slidably positioned within the second latch 416. In other words, the second latch 416 is molded in a manner that allows the pins 410 to slide within the second latch 416. When the pins 410 are slid into the second latch 416 (i.e., disengaged from the retaining wall(s) 412), the user can force the second. latch 416 up 413. To prevent the second latch 416 from freely sliding up 413 and as a second or redundant security feature, a second spring-loaded latch hold 414 is positioned within the seat portion 104. The second spring-latch hold 414 operates as a redundant lock to hold the second latch 416 in a locked position. Thus, the user can draw the second pair of pins 410 toward each other and disengage the pins 410 from the retaining wall(s) 412; thereafter, the user can force the latch 416 up 413, which simultaneously forces the second latch hold 414 up 413 and compresses the spring that holds the second latch 416 in place. By forcing the second latch 416 up 413, the second. latch 416 is removed from a second catch 418 (e.g., a slot or hole) formed in the base 100. In other words, the base 100 includes a second catch 418 that locks against the second latch 416 when the seat portion 104 is positioned in the erect scooter configuration. By sliding the second latch 416 up 413 and away from the second catch 418, the seat portion 104 is free to pivot down to the ride-on configuration.

Figure 5:
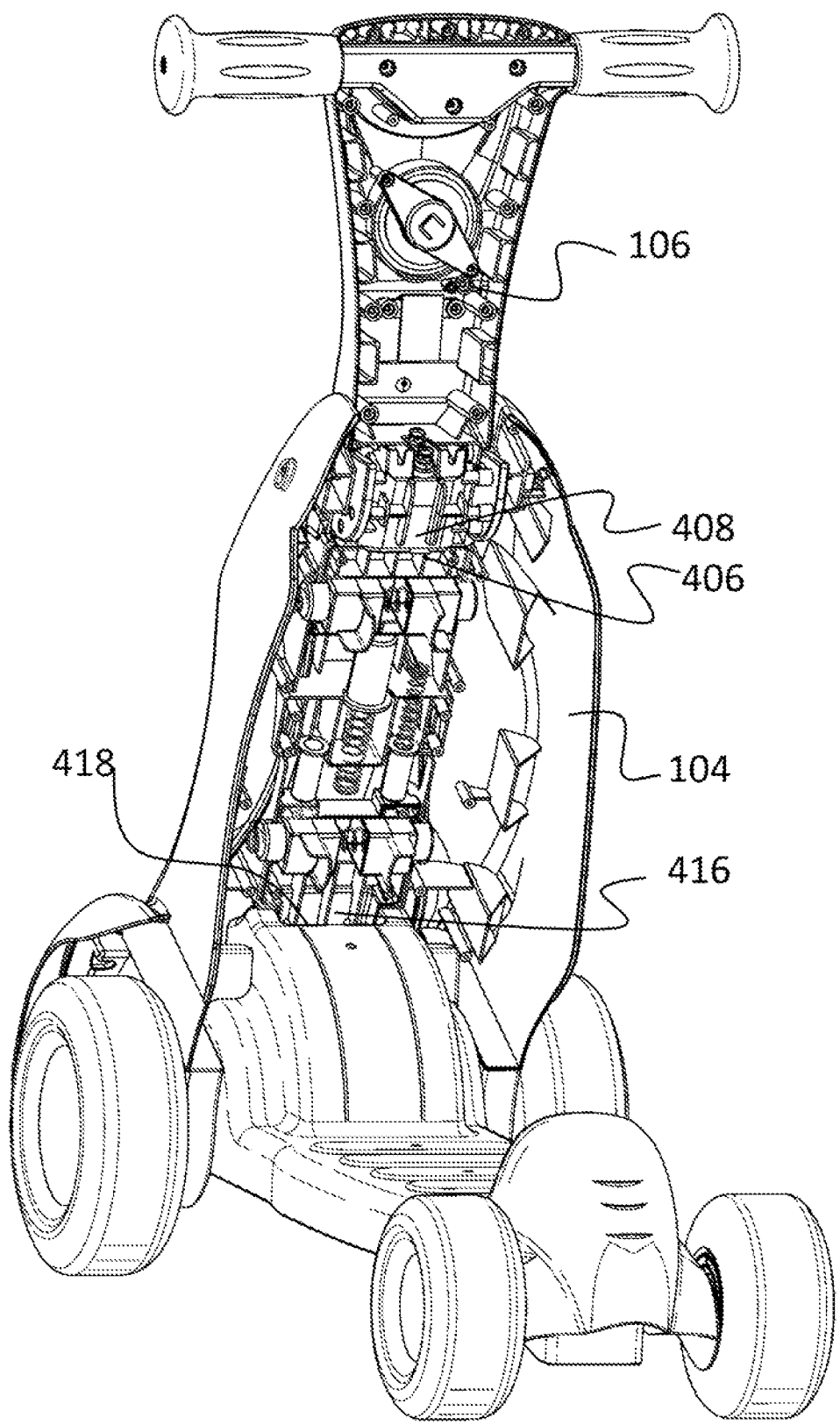
FIG. 5 is an interior-view illustration of the convertible scooter ride-on according to the principles of the present invention.

For further understanding, FIG. 5 provides another interior view of the convertible toy in the scooter configuration, showing an interior of the handle pole 106. As shown, in this configuration, the first latch 406 is securely locked in place against the first catch 408 to secure the handle pole 106 in the erect scooter configuration. In this non-limiting example and as shown, the first catch 408 is a plate which is secured within the handle pole 106. Similarly and as shown, the second latch 416 is securely locked in place against the second catch 418 to secure the seat portion 104 in the erect scooter configuration. In this non-limiting example, the second catch 418 is a slot molded into the base 100 that receives the second latch 416.

As noted above, when in the scooter configuration, the convertible toy needs to be relatively stable to prevent it from inadvertently collapsing to the ride-on configuration. Alternatively, when in the ride-on configuration, the convertible toy may optionally include a ride-on lock to prevent it from lifting and maintain its configuration securely in the ride-on position. The ride-on lock is any suitable mechanism or device that allows a user to selectively lock the convertible to in the ride-on configuration. As a non-limiting example and referring again to FIG. 4, the ride-on lock includes spring-loaded pin 430 that lockingly engages with a pinhole formed on the side of the handle pole 106 when the handle pole 106 is in the ride-on configuration By withdrawing the pin 430 from the pinhole, the handle pole 106 is allowed to pivot up as desired. Further, the handle pole 106 includes a base catch 432 formed therein. Alternatively and as shown in FIG. 1B, the base 100 includes a base latch 120. The base latch 120 is a protrusion formed in or otherwise attached with the base 100, while the base catch 432 is a recess that fits around and selectively locks with the base latch 120 when the seat portion 104 is in the ride-on configuration and resting on the base 100. Thus, in one non-limiting example, the user draws the pin 430 from the pinhole, which allows the user to pivot the handle pole 106 up, which withdraws the base catch 432 from the base latch 120, thereby allowing the user to selectively lift the seat portion 104 and handle pole 106 into the scooter configuration.

What is claimed is:

1. A convertible scooter ride-on, comprising:
a base with a plurality of wheels attached thereto;
a seat portion pivotally attached with the base;
a handle pole pivotally attached with the seat portion; and
wherein the seat portion and handle pole are convertible between a first ride-on configuration in which the seat portion operates as a seat for a user and a second scooter configuration in which the seat portion and handle pole are pivoted up and securely locked into an erect position, wherein the base includes an upper surface having two sides such that at least a portion of the two sides of the upper surface are unobstructed and free of surrounding walls, such that when in the scooter configuration, the upper surface of the base is exposed to operate as a platform upon which the user can stand to operate the scooter.

2. The convertible scooter ride-on as set forth in claim 1, further comprising a scooter locking mechanism, the scooter locking mechanism operable for allow the user to selectively lock the seat portion and handle pole in the scooter configuration.

3. The convertible scooter ride-on as set forth in claim 2, wherein the scooter locking mechanism includes a first latch system and a second latch system, the first latch system being operable for latching the handle pole in an erect position with respect to the seat portion, and wherein, the second latch system is operable for latching the seat portion in an erect position with respect to the base.

4. A convertible scooter ride-on, comprising:
a base with a plurality of wheels attached thereto;
a seat portion pivotally attached with the base;
a handle pole pivotally attached with the seat portion;
wherein the seat portion and handle pole are convertible between a first ride-on configuration in which the seat portion operates as a seat for a user and a second scooter configuration in which the seat portion and handle pole are pivoted up and securely locked into an erect position, whereby in the scooter configuration, the user can stand on the base;
wherein when in the scooter configuration, an upper surface of the base is exposed to operate as a platform upon which the user can stand to operate the scooter;
a scooter locking mechanism, the scooter locking mechanism operable for allow the user to selectively lock the seat portion and handle pole in the scooter configuration;
wherein the scooter locking mechanism includes a first latch system and a second latch system, the first latch system being operable for latching the handle pole in an erect position with respect to the seat portion, and wherein the second latch system is operable for latching the seat portion in an erect position with respect to the base; and
wherein the first latch system includes a pair of spring-loaded retractable pins that are slidably positioned within a first latch and lockable with one or more retaining wails, and wherein the handle pole includes a first catch for selectively locking against the first latch, whereby the user can selectively withdraw the pair of spring-loaded retractable pins from the retaining walls and, thereafter, slide the first latch out of locking engage with the first catch, which allows the handle pole to unlock and pivot into the ride-on configuration.

5. The convertible scooter ride-on as set forth in claim 4, wherein the second latch system includes a pair of spring-loaded retractable pins that are slidably positioned within a second latch and lockable with one or more retaining walls, and wherein the base includes a second catch for selectively locking against the second latch, whereby the user can selectively withdraw the pair of spring-loaded retractable pins from the retaining walls and, thereafter, slide the second latch out of locking engage with the second catch, which allows the seat portion to unlock and pivot into the ride-on configuration.

\* \* \* \* \*